United States Patent [19]
Arthur et al.

[11] Patent Number: 5,307,763
[45] Date of Patent: * May 3, 1994

[54] RESTRICTED AREA ALARM SYSTEM

[76] Inventors: David L. Arthur, 12456D Sealane Dr., Florissant, Mo. 63033; David S. Pohlman, 208 Carlyle Lake Dr., Creve Coeur, Mo. 63141

[*] Notice: The portion of the term of this patent subsequent to May 4, 2010 has been disclaimed.

[21] Appl. No.: 57,476

[22] Filed: May 3, 1993

Related U.S. Application Data

[63] Continuation-in-part of Ser. No. 882,483, May 13, 1992, Pat. No. 5,207,179.

[51] Int. Cl.⁵ .............................................. A01K 15/04
[52] U.S. Cl. ..................... 119/718; 119/719; 119/857; 340/573
[58] Field of Search ............... 119/29, 718, 719, 720, 119/857; 340/573

[56] References Cited

U.S. PATENT DOCUMENTS

| | | | |
|---|---|---|---|
| 3,137,271 | 6/1964 | Etter | 119/29 |
| 3,980,051 | 9/1976 | Fury | 119/29 |
| 4,675,656 | 6/1987 | Narcisse | 340/573 |
| 4,733,633 | 3/1988 | Yarnall et al. | 119/29 |
| 4,777,478 | 10/1988 | Hirsch et al. | 340/573 |
| 4,967,695 | 11/1990 | Giunta | 119/29 |
| 5,061,918 | 10/1991 | Hunter | 119/29 |
| 5,086,290 | 2/1992 | Murray et al. | 340/573 |
| 5,119,072 | 6/1992 | Hemingway | 340/573 |
| 5,170,149 | 12/1992 | Yarnall | 119/29 |
| 5,214,411 | 5/1993 | Herbruck | 119/29 |

Primary Examiner—John G. Weiss
Attorney, Agent, or Firm—Rogers, Howell & Haferkamp

[57] ABSTRACT

A restricted area alarm confinement system includes a loop antenna for placement about the border of an area within which a child or other person is desired to be confined, or excluded from, a control panel for recording a voice command in the parent's voice, and means for generating an RF signal encoded with said prerecorded voice command for transmission over said antenna. A transceiver is mounted to a harness or other support for attachment to the child such that as the child approaches the antenna the parent's voice command is received from the antenna and announced to the child to encourage him to withdraw from the border. A threshold level detector detects when the child approaches even closer to the antenna and the transceiver includes a transmitter section for transmitting a warning signal to a beeper/receiver held by the parent. The control panel further includes monitoring circuits for monitoring the integrity of the loop antenna and the AC power supply. If a break is detected in the loop antenna, or if the control panel switches to its included battery backup, a display provides a visual message and an announcement is made over a speaker in the control panel to alert the operator that a system failure has occurred.

27 Claims, 6 Drawing Sheets

RESTRICTED AREA ALARM SYSTEM

CROSS REFERENCE TO RELATED APPLICATION

This application is a continuation-in-part of U.S. Ser. No. 07/882,483 filed May 13, 1992, now U.S. Pat. No. 5,207,179 issued May 4, 1993.

BACKGROUND AND SUMMARY OF THE INVENTION

Systems for controlling dogs, and other pets, from moving out of a predetermined area are known in the art. The prior art systems typically consist of an RF signal generator driving a loop antenna, and a matched RF signal receiver attached to a dog collar. Prior to use, the loop antenna is strung out, and perhaps buried, around the boundaries of the predetermined area and so, when energized, defines an apparent fence constituted of radiating RF signals in the vicinity of the boundaries. In use, as the dog approaches the boundary-determining antenna, the matched receiver picks up the signal and in response activates an electrical circuit which produces a shock to the dog. It is also typical that the prior art systems will have the electric shock increase in intensity as the dog approaches the antenna closer still. As an alternative to a shock, a loud noise can be created which is intended to annoy the dog and drive it back. A prior art system exemplary of the above is shown by U.S. Pat. No. 3,753,421.

Other prior art systems for controlling dogs to remain within a predetermined area include both a handheld RF transmitter (or "walkie-talkie") and a matched RF receiver on a dog collar to facilitate live broadcasts of verbal commands to the dog. A prior art system exemplary of this latter concept is shown by U.S. Pat. No. 4,745,882.

There are several disadvantages associated with the prior art systems. As previously indicated, the automatic systems achieve control over the dog by typically subjecting the dog to an alarming noise or by an electric shock, and both the noise and the shock are designed to annoy, offend or startle the dog. Unfortunately, in practice, these shocks may be so extreme as to cause pain, which most caring pet owners are loathe to inflict on their pets. Even if the shock intensity is controlled properly to limit the "pain", many dog owners are reluctant to use these prior art systems because of their objection to the basic premise of shocking their pet. As such, these systems all rely on a negative feedback and do not take advantage of the training most dogs receive to obey voice commands from their masters. As for the "walkie-talkie" system, it is chiefly deficient in not operating automatically.

Further disadvantages associated with the automatic prior art systems involve the absence of self-monitoring functions. That is, since control of the dog is achieved while the prior art systems operate in an automatic mode, there is no provision for alerting the system user when there is a system malfunction. For example, such malfunctions can include a break in the loop antenna, or loss of AC power, or a more serious system failure, any of which would result in ineffective confinement of the pet. Further disadvantages associated with the prior art systems involve the lack of facility with these systems for use by pet owners who are sightless or hearing impaired.

In order to solve these and other problems in the prior art, the inventors herein have succeeded in designing and developing a pet confinement system as disclosed and claimed in the parent U.S. Pat. No. 5,207,179 which announces a command to the dog, in the owner's voice, to retract from the edge of the yard or the like as the dog draws near. Should the dog ignore the command, and advance even closer, the dog will receive a shock to more directly indicate to him that, not only has he gotten too close, but he has also disobeyed his master's command. This positive reinforcement of a voice command makes it more likely that the dog will follow the voice command the next time he hears it, and thus avoid the shock. With that invention, a more humane solution to the pet confinement problem has been achieved. Furthermore, the confinement system takes advantage of one of the most basic forms of training which is commonly used with pets, i.e. voice training, and therefore makes its implementation more readily adaptable and much more likely to be successful as it builds on this common training. In other words, that invention may very well be implemented where prior art systems fail as the dog, for whatever reasons, fails to associate the shock with the prohibited crossing of the border and fails to remain confined.

In implementing the pet confinement system of the parent patent, the inventors herein have also designed and developed a master control panel which not only provides for an operator to prerecord a command of his own choosing and to which the dog is most likely to respond, but also monitors the system and indicates to an operator when any one of the most common malfunctions occurs. The master control panel includes a display and an audio announcement when a break in the loop antenna occurs, or when there is a loss in AC power and the system is on battery backup. As the master control panel is typically mounted in the garage, an operator will regularly pass by the control panel on his way to and from his car, and in doing so will be notified by the visual and audio announcement of a system failure. This feature also renders the system "user friendly" for a sightless or hearing impaired owner who would have difficulty with a prior art system and who is probably more likely than others to own a pet.

The pet confinement system has a loop antenna for placement about a boundary of a confinement area and around shrubs and the like, and a control panel connected to the loop antenna for generating and broadcasting an RF signal thereover. The control panel includes circuitry for recording a spoken command in the pet owner's own voice, and RF circuitry for generating an RF signal encoded with the spoken command for transmission over the loop antenna. This pet confinement system also has a portable battery operated RF receiver adapted for attachment to a pet collar. The portable RF receiver includes an RF detector and miniature audio speaker for decoding and announcing the spoken command and tone in response to the pet moving within a predetermined distance of the antenna. The recorded spoken command can be something like "Fido, get back. Get back Fido, get back.", or the like, which is the same spoken command which is used to train the pet upon system installation.

The portable RF receiver further includes a threshold level detector for detecting reception of the tone at an intensity indicative of the pet being within a second, closer, predetermined distance to the loop antenna. A circuit for applying a pulsed shock to the pet is responsive to this threshold level detector. These pulsed shocks reinforce the dog's obedience to his master's command and further dissuade him from passing outside the antenna barrier. Most dogs soon learn that disobeying the master's voice command results in a shock, and thus most often avoid any shock after only a few excursions towards the border.

The control panel additionally includes circuitry which monitors for system failures, and both visual and audio indicators for indicating any system failures to a system operator. These indicators include an LCD screen for displaying preprogrammed messages, and a console speaker for announcing prerecorded messages. One of the monitoring circuits is a circuit for monitoring the loop antenna. In operation, it detects whether the loop antenna fails to conduct an electric current. The other of the monitoring circuits detects whether the standard 120 VAC power supply has failed.

As an improvement on the pet confinement system as disclosed and claimed in the parent patent, the inventors herein have succeeded in designing and developing a restricted area alarm system which utilizes many of the same features of the pet confinement system and which also includes a second broadcast and receive circuit for alerting another person that the boundary is in danger of being broached. Instead of utilizing a loop antenna for containing a dog within a yard or the like, the inventors utilize a loop antenna for surrounding what might be a dangerous or hazardous condition for a child, such as a swimming pool. With a portable receiver/transmitter mounted in a backpack conveniently carried by the child, the child will receive a parent's spoken warning to not go near the swimming pool as he first approaches the pool. If the child ignores the warning, and continues to approach the swimming pool beyond a second predetermined, and closer, distance, a transmitter carried in the backpack will transmit a signal to a beeper or other remote battery powered receiver which can be carried by the parent so as to alert the parent that the child is dangerously close to the swimming pool. Thus, the present invention will permit a parent to attend to other matters and be comforted in the knowledge that as a child approaches a previously identified and marked dangerous location or condition, the child will first be warned away therefrom and, if necessary, the parent notified in sufficient time to take such measures as would prevent an unfortunate accident to occur.

In addition to its use for a child alert system, this invention may also be utilized with respect to any person who is infirm, forgetful, or otherwise unable to fend for themselves if they unintentionally wander into what may be for them a dangerous area. One such other example includes elderly people who are victims of Alzheimer's disease. With such individuals, it might perhaps be desirable for a boundary around the person's property to be marked as well as unsafe areas such as swimming pools or the like. Still another example would be for use with people of reduced mental capability who might otherwise have a tendency to wander from their home or other surroundings or into dangerous areas.

In adapting the present invention for use with humans, the ability to prerecord and announce a spoken message from a family member or other loved one is especially helpful and beneficial to the operation of this device in this environment. As an example, a calm, reassuring voice when announced can gently warn away one who would otherwise be confused by an indifferent alarm or other signal which would have perhaps no meaning to a forgetful or limited mental capacity person. With children, a parent's stern message may also be much more helpful in controlling the movement of the child as opposed to such an alarm or other signal. This feature makes the present invention uniquely suited for use in this application.

While the principal advantages and features of the present invention have been disclosed above, a more complete understanding of the invention may be attained by referring to the drawings and description of the preferred embodiment which follow.

DETAILED DESCRIPTION OF THE PREFERRED EMBODIMENT

Figure 1:
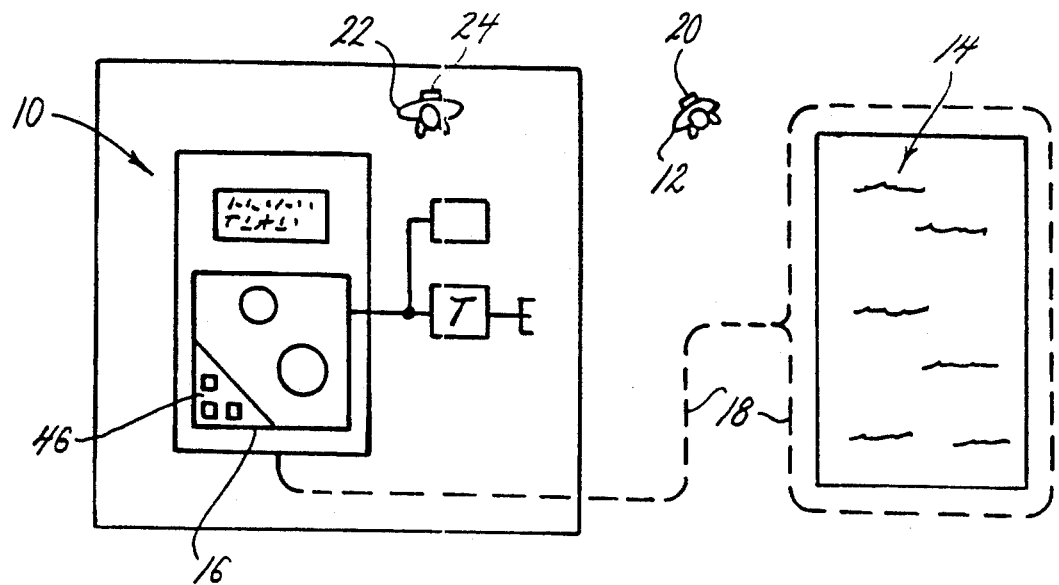
FIG. 1 is a plan view of the restricted area alarm system of the present invention installed in a homeowner's yard and around a swimming pool.

As shown in FIG. 1, a restricted area alarm system 10 is provided for controlling the movement of a person, such as a child 12, to prevent either their egress or ingress from within or without a confinement area 14. This system 10 generally comprises a system control panel 16 which continuously generates and transmits a voice encoded RF signal to a loop antenna 18 for the purpose of establishing a wireless communication link with a battery operated RF transceiver 20 carried by the child 12 as he/she moves within and about the confinement area 14. As the child 12 moves within a first predetermined distance of the loop antenna 18, the RF transceiver 20 receives the voice encoded signal and announces it to the child 12. This voice encoded signal has previously been recorded by another, such a parent 22 with an appropriate message such as "No, no, Johnny. Don't go near the swimming pool. Return to the house." Should the child ignore the voice message which he hears through the speaker, and approaches the loop antenna to a closer second predetermined distance, a threshold detector in the RF transceiver 20 detects the increased signal strength received from the RF signal emanating from loop antenna 18 and triggers a transmitter which transmits a pulse to a second RF receiver 24 carried by the parent 22 to notify and alert the parent that the child 12 is too close to the restricted area 14 and immediate preventative action needs to be taken.

Figure 2:
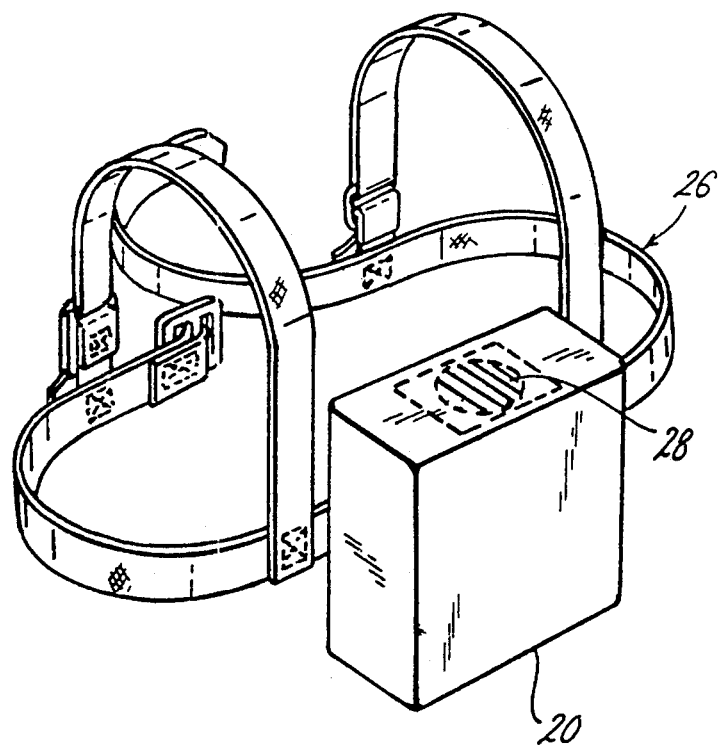
FIG. 2 is a perspective view of the battery operated transceiver.

The RF transceiver 20 is shown in FIG. 2 and generally includes a harness 26 or the like for securing the transceiver 20 comfortably onto a child 12. The harness 26 shown in FIG. 2 is merely exemplary and there are many kinds of harnesses, belts, slings, or other means for attaching transceiver 20 to the child 12, any one of which would be suitable for use with the present invention. As shown in FIG. 2, the transceiver 20 includes a speaker 28 mounted near the top of the transceiver 20 such that the prerecorded message may be directed towards the child's head and thus receive appropriate attention. With this orientation of speaker 28, maximum effectiveness thereof may be assured.

Figure 3:
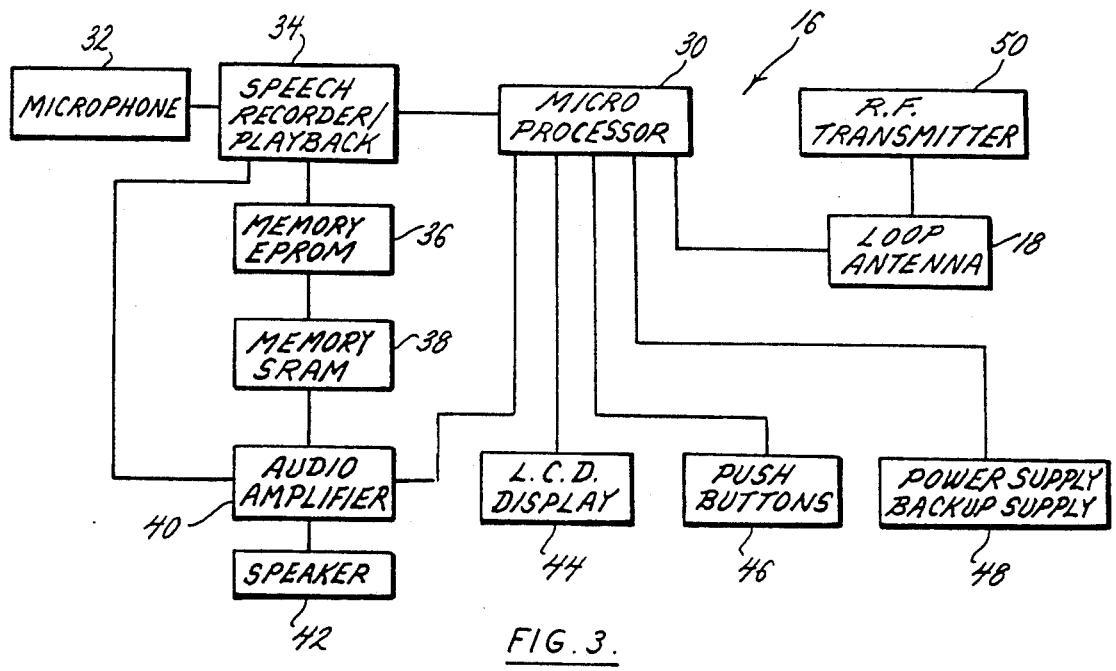
FIG. 3 is a block diagram of the system control panel.

As shown in block diagram in FIG. 3, the system control panel 16 includes a microcomputer or processor 30 at its heart for controlling the operation of the system. A microphone 32 is used to input the prerecorded message into the speech recorder/playback circuit which stores and retrieves the recorded message from a memory EPROM 36 and SRAM 38. An audio amplifier 40 amplifies both the parent's prerecorded instructional message and other various prerecorded announcements for system operation for announcement over speaker 42. An LCD display 44 also provides visual display of certain system messages and a keyboard or set of push buttons 46 may be used to enter data into microprocessor 30 for operation, troubleshooting, etc. A power supply 48 provides backup power in the event of the failure of the standard AC power supply readily available at most installations. An RF transmitter 50 modulates the prerecorded voice message and transmits it over the loop antenna 18.

Figure 4:
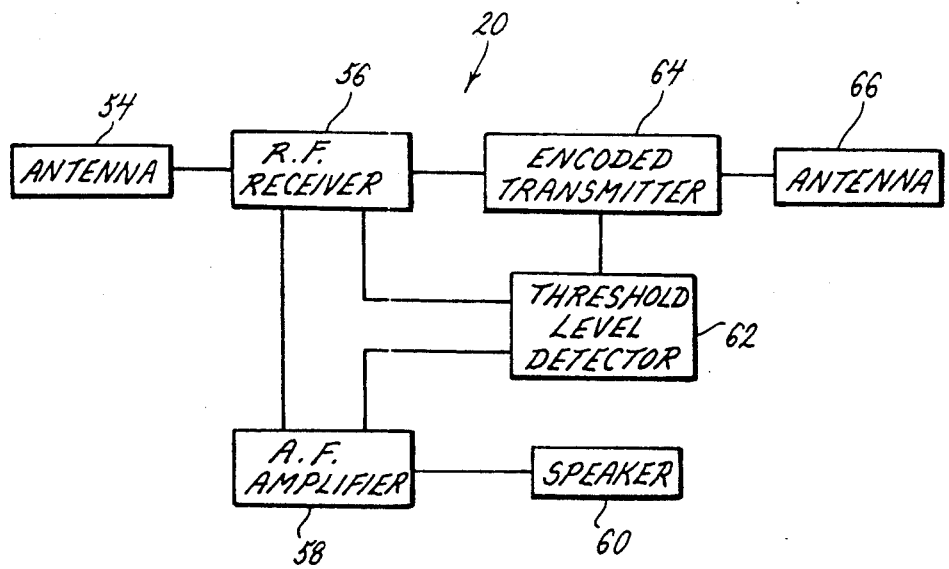
FIG. 4 is a block diagram of the battery operated transceiver.

As shown in FIG. 4, the RF transceiver 20 includes a first antenna 54 for picking up and sensing the voice encoded RF signal being emanated over loop antenna 18. An RF receiver 56 demodulates the voice encoded signal and an AF amplifier 58 amplifies it for announcement over speaker 60 as the child 12 moves within a first predetermined distance of loop antenna 18. A threshold level detector 62 senses when the signal strength from the loop antenna 18 exceeds a predetermined level, thereby indicative of the child 12 moving yet closer to the loop antenna 18 and triggers an encoded transmitter 64 which transmits a signal over a second antenna 66 to a receiver/beeper (see FIG. 5) which alerts the parent 22, as previously explained.

Figure 5:
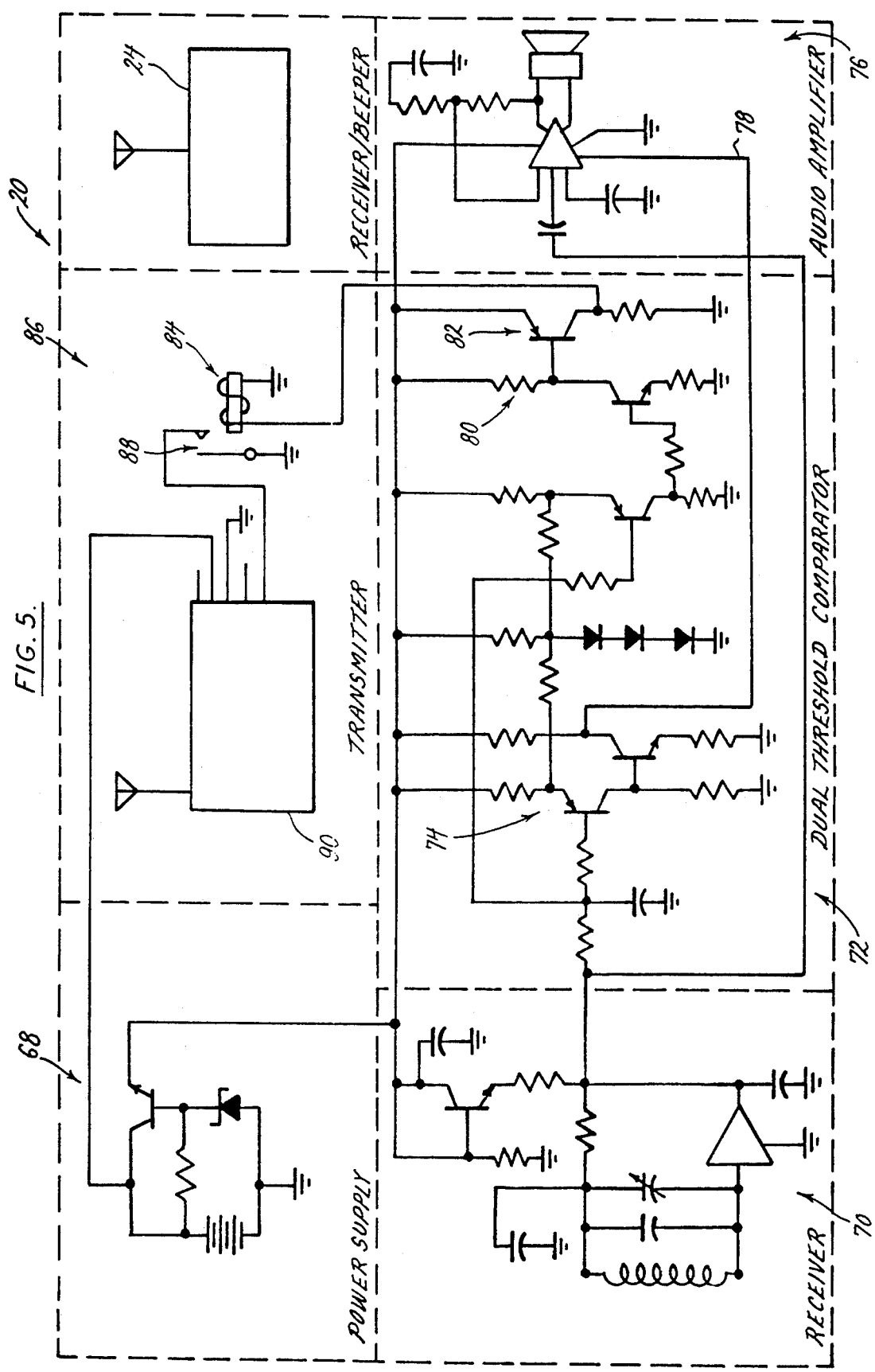
FIG. 5 is a detailed schematic of the transceiver and receiver/beeper for parent.

A detailed schematic of the RF transceiver 20 is shown in FIG. 5 and generally includes a battery and power supply circuit 68 as the RF transceiver 20 is battery powered and carried by the child 12, as shown in FIG. 1. A receiver section 70 receives the voice encoded RF signal broadcast over loop antenna 18 and produces an output voltage to the dual threshold comparator circuit 72. A first pair of transistors 74 form a first comparator circuit for determining when the signal strength has reached a first predetermined value to thereby enable the audio amplifier section 76 over connection 78. A second transistor pair 80 form a second comparator for determining when the signal strength has reached a second level indicative of the transceiver 20 being even closer to loop antenna 18 to thereby turn on an inverter transistor 82 which energizes coil 84 in the transmitter section 86 to close contact 88 and thereby turn on transmitter 90. Transmitter 90, paired with receiver/beeper 24, may be Seco-Larm Enforcer Model 5905 encoded digital transmitter/receiver. The signal from transmitter 90 is an RF signal which is then received by the receiver/beeper 24 to alert the parent that the child has moved too close to the restricted area 14.

The electronic circuits and components of this system control panel 16 are, more particularly, mounted on three circuit cards. Accordingly, there is a power supply/transmitter board 200 illustrated in FIG. 6, a logic board 202 illustrated in FIG. 8, and a switch board 204 illustrated in FIG. 9.

Figure 6:
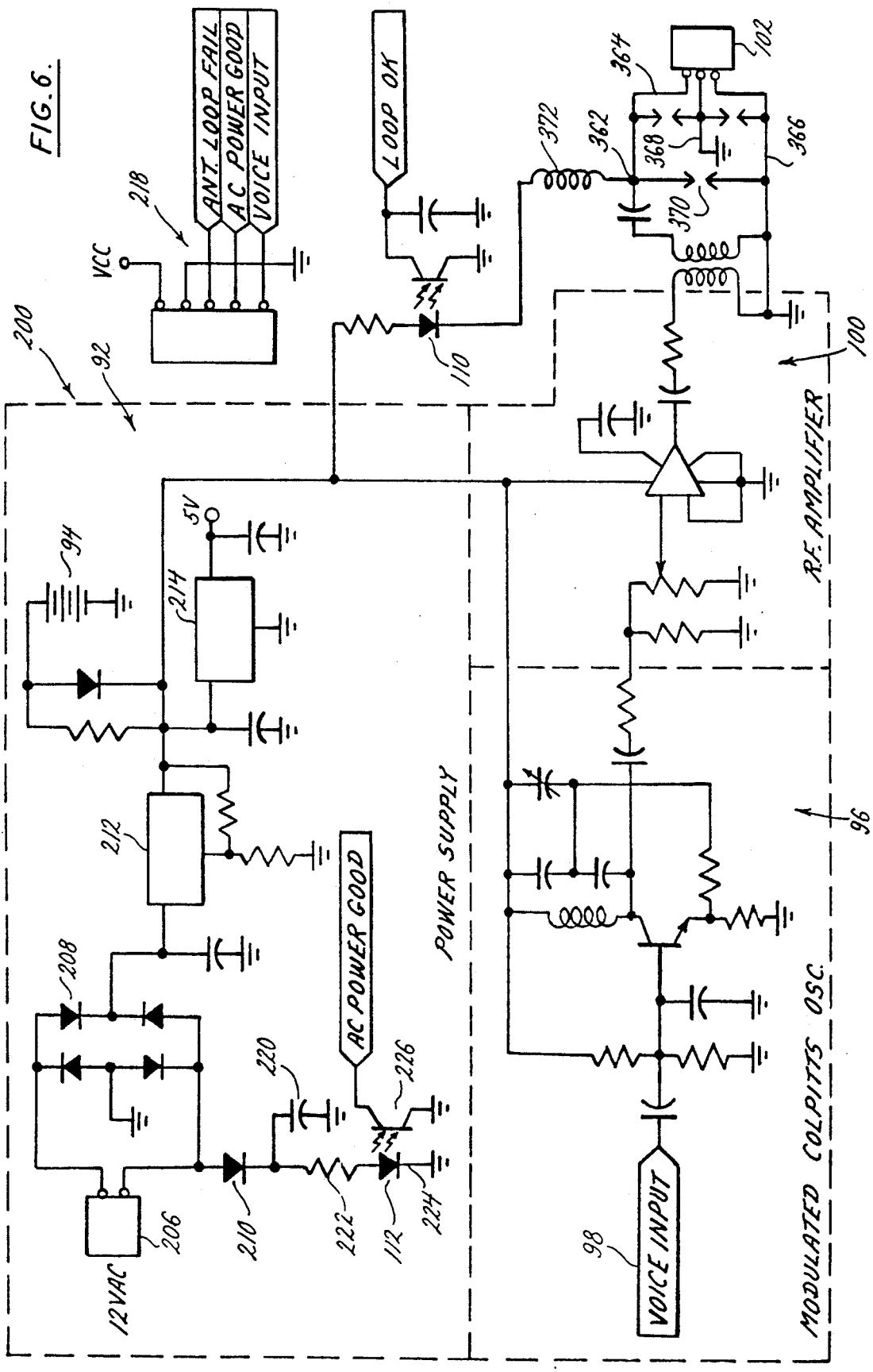
FIG. 6 is a detailed schematic diagram of the system control panel/transmitter.

As shown in FIG. 6, the power supply/transmitter board 200 of the system control panel 16 includes a power supply section 92 with a battery 94 providing battery backup for powering an oscillator section 96 which modulates a voice input 98 which is then amplified by an RF amplifier section 100 for output through the loop antenna 18 via a connector 102.

Figure 8:
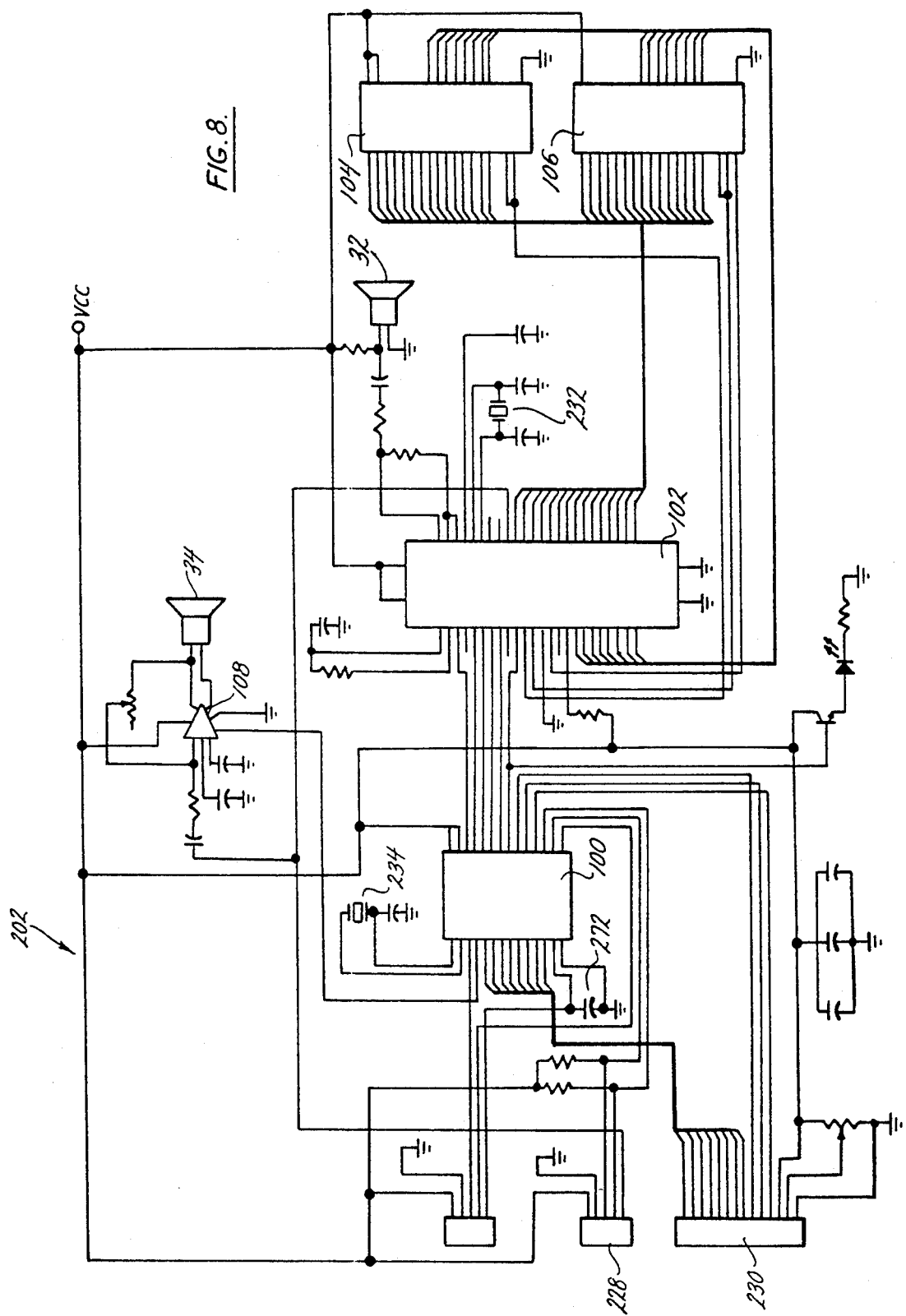
FIG. 8 is a detailed schematic diagram of the logic board.

With reference to FIG. 8, the logic board 202 has a connector 228 through which 5 VDC power is supplied, as developed on the power supply/transmitter board 200 (FIG. 6) and conveyed through connector 218, mentioned above. It is the logic board 202 which has mounted on it the microprocessor 30, the digital voice recorder 102, the EPROM 104 and the SRAM 106. A flowchart for the microprocessor's program is shown in Attachment A.

Figure 7:
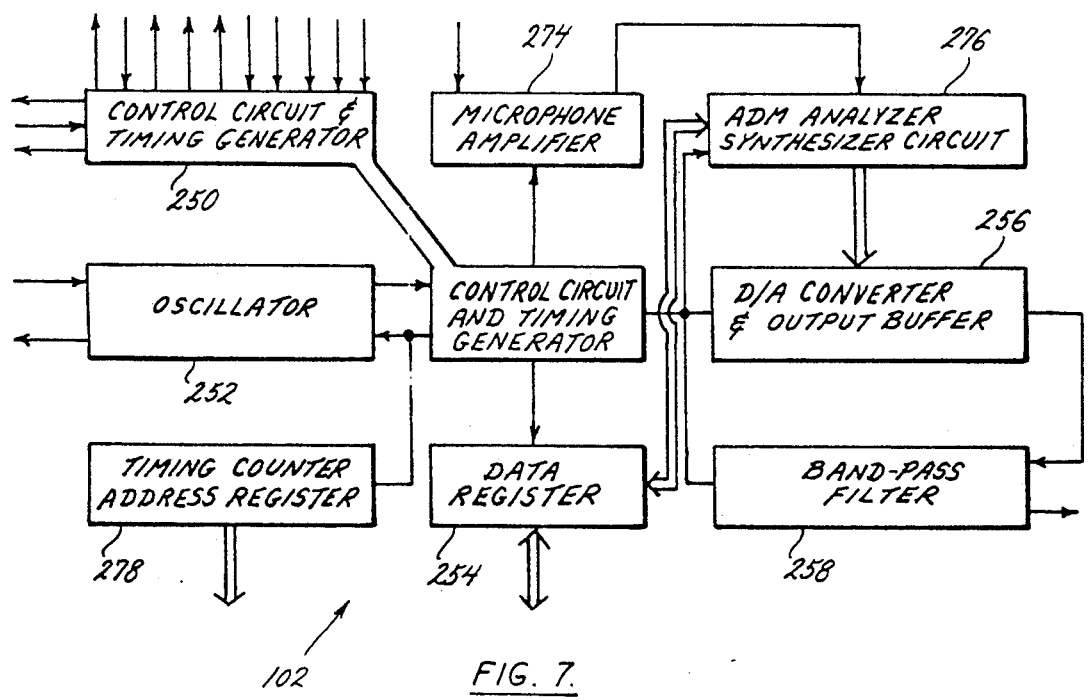
FIG. 7 is a block diagram of the digital voice recorder IC.

The digital voice recorder 102's internal electronic circuits and components are exemplified in the block diagram of FIG. 7. The circuits and components of the digital voice recorder 102 include a control and timing generator circuit 250 which responds to control signals sent by the microprocessor 30, as well as generates its own control signal outputs. The control signals which are outputted by the control and timing generator circuit 250 include a "busy" signal which is sent to the microprocessor 30, a "playback" signal which is sent to the EPROM 104, and "playback" and "record" signals which are sent to the SRAM 106. The clock pulses for this control and timing generator circuit 250 are provided by a local oscillator circuit 252 which is in communication with the crystal oscillator 232 (FIG. 8).

To facilitate the general "playback" operation of this digital voice recorder 102, its internal electronic circuits further include a data register 254 which is interlinked by data buses with both the EPROM 104 and SRAM 106. There is also a digital-to-analog converter 256 which converts a digitized spoken message or command into an audio signal. There is also a band-pass filter 258 which filters the audio signals before being amplified by audio amplifier 108 and the RF transmitter circuits 96, 100, under control.

Figure 9:
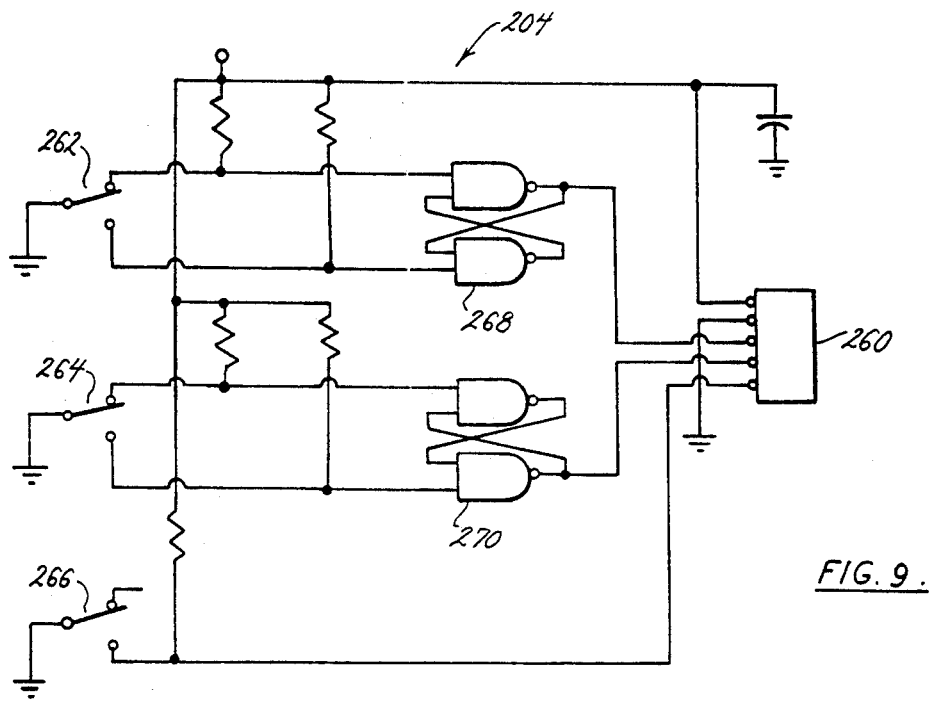
FIG. 9 is a detailed schematic diagram of the switch board.

With reference to FIG. 9, the switch board 204 has a connector 260 which interlinks the switch board 204 and logic board 202 (FIG. 8). The 5 VDC power is also conveyed through connector 260. The switch board 204 is operably linked with three pushbuttons which are mounted on the keypad 46 (FIG. 1). There are a "record" pushbutton 262, a "playback" pushbutton 264 and a "reset" pushbutton 266. Cross connected logic gates 268, 270 eliminate contact bounce.

The digital voice recorder 102, as exemplified in the block diagram of FIG. 7, includes a microphone amplifier 274, an ADM analyzer/synthesizer circuit 276, and data and address registers 254 and 278.

Under its own "record" procedure, the digital voice recorder 102 has its control and timing generator circuit 250 transmit a signal to the SRAM 106 for preparing it for recording. From that time forward, the system operator/pet owner may speak into the microphone 32 for the recording of a spoken command not longer than 11 1/2 seconds. The microphone 32 transmits an audio signal to the microphone amplifier 274, for transmission therefrom to the ADM analyzer/synthesizer circuit 276. The ADM analyzer/synthesizer circuit 276 converts the analog audio signal into a digital one, as is known in the art. This digital signal is conveyed to the data register 254. Each binary "word" in the data register 254 is coupled with an incrementally changing binary "word" address in the address register 278. These coupled address and data "words" are coordinately transmitted onward to the SRAM 106 (FIG. 8), for digital storage thereof. After the recording time has elapsed, about 11 ½ seconds, the control and timing generator circuit 250 clears the transmission of the "busy" signal.

The system operator can manually actuate the "playback" pushbutton 264 (FIG. 9), which activates the microprocessor to transmit an appropriate "playback" signal to the digital voice recorder 102. The digital voice recorder 102 has its own "playback" procedure, as has been generally described above, which results in the audible announcement of the recorded command in the SRAM 106 over the audio speaker 34.

With reference to FIG. 6, the audio signal from the digital voice recorder 102 (FIG. 8) is conveyed through connector 228 of the logic board 202 (FIG. 8) and connector 218 of the power supply/transmitter board 200.

The RF oscillator 96 includes an LC tank circuit continuously resonating at the desired 455 kHz. The output of this RF oscillator 96 is a voice encoded 455 kHz RF signal. The voice encoded RF signal output of this RF oscillator 96 is inputted to an RF amplifier 100 which may be an LM384, for amplifying the voice encoded RF signal for consequential output to the loop antenna 18 through connector 102. The loop antenna 18 (FIG. 1) is connected to the power supply/transmitter board 200 of this system control panel 16 at connector 102. When this loop antenna 18 is operational and an amplified RF signal is applied to it, this loop antenna 18 broadcasts an RF signal which is first detectable by the RF transceiver 20 (FIG. 1) at approximately 5 feet. Connector 102 has three lines 364, 366 and 368 for RF output and earth ground, respectively. These three lines 364, 366 and 368 are all interlinked by spark gap devices 370 for surge protection.

At junction 362, the other incoming branch conducts current from the faulty antenna detector 110. The faulty antenna detector 110 is an optoisolator which may be a PS2501-2, just like the power failure detector 112. This faulty antenna detector 110 has a throughput current which energizes an LED, as has already been described, to RF choke 372, junction 362, and then over the loop antenna 18 through connector 102 and back again to mother board ground on line 366. Thus, any break in the loop antenna 18 will correspondingly break the circuit, hence de-energizing the faulty antenna detector 110's LED. The microprocessor 30 responds to a negative indication in a manner which has already been described.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A restricted area alarm system, said restricted area having a boundary associated therewith, the system including:
    means for emitting a voice encoded RF signal;
    means connected to said emitting means for generating said voice encoded RF signal from a prerecorded spoken command and broadcasting same over said emitting means; and
    a battery operated RF receiver adapted for attachment to a subject desired to be warned, said RF receiver having means for decoding said voice encoded RF signal and announcing said prerecorded command to said subject as said subject approaches within a predetermined distance to said boundary, thereby to encourage said subject to withdraw from said boundary.

2. The system of claim 1 wherein said announcing means is adapted for attachment to said subject.

3. The system of claim 2 further comprising means for recording said spoken command.

4. The system of claim 3 wherein said recording means includes means for changing the recorded spoken command.

5. The system of claim 4 further comprising a control panel; said control panel including said generating and broadcasting means, and said recording means; and wherein said control panel further comprises means for monitoring said emitting means for a failure to emit said voice encoded RF signal and means for indicating said failure to an operator.

6. The system of claim 5 wherein said indicating means includes a visual display and means for producing an audio indication.

7. The system of claim 6 wherein said audio indication means includes means for announcing a prerecorded spoken message.

8. The system of claim 7 wherein said control panel further comprises means for connection to an A-C supply and a battery back-up, and said indicating means includes means for indicating that said control panel is operating on battery back-up.

9. The system of claim 8 wherein said emitting means is a loop type antenna, said loop antenna being placed about said boundary.

10. The system of claim 1 wherein said battery operated RF receiver further comprises means for detecting reception of said voice encoded RF signal as said subject approaches within a second, closer, predetermined distance to said boundary, and wherein said battery operated RF receiver further comprises means for broadcasting a second RF signal in response to said subject approaching within the second predetermined distance to said boundary, and further comprising a second battery operated RF receiver tuned to receive said second RF signal and thereby sound a remote alert.

11. A restricted area alarm system, the system including:
    a loop type antenna for placement about a boundary of a defined area;
    a control panel connected to said antenna, said control panel including means for recording a spoken command, means for generating an RF signal encoded with said spoken command, and means for transmitting said encoded RF signal over said antenna; and
    a portable battery operated RF receiver adapted for attachment to a subject, said RF receiver including means for decoding and announcing said spoken command as said subject moves within a predetermined distance of said antenna.

12. The system of claim 11 wherein said battery operated RF receiver further comprises means for detecting reception of said voice encoded RF signal as said subject approaches within a second, closer, predetermined distance to said boundary, and wherein said battery operated RF receiver further comprises means for broadcasting a second RF signal in response to said subject approaching within the second predetermined distance to said boundary, and further comprising a second battery operated RF receiver tuned to receive said second RF signal and thereby sound a remote alert.

13. The system of claim 11 wherein said control panel includes means for monitoring said system for failures and means for indicating said system failures to an operator.

14. The system of claim 13 wherein said indicating means includes a visual display for displaying preprogrammed messages and an announcing system for announcing prerecorded messages.

15. The system of claim 14 wherein said monitoring means includes means for monitoring said loop type antenna, and said indicating means includes means for indicating faults with said loop type antenna.

16. The system of claim 15 wherein said control panel further comprises means for connection to an A-C supply and a battery back-up; and said monitoring means includes means for monitoring said A-C supply; and said indicating means includes means for indicating that said control panel is operating on battery back-up.

17. In a restricted area alarm system including a loop antenna oriented about a boundary, said antenna having means for broadcasting a first signal which is received by a receiver attached to a subject, the improvement comprising a control panel for generating and supplying a second signal to said antenna and means for monitoring said antenna for a failure to conduct said second signal, and means for indicating said failure to an operator.

18. The system of claim 17 wherein said control panel has means for connection to an AC power supply and a battery backup, and means for automatically switching to said battery backup upon interruption of power from said AC power supply.

19. The system of claim 18 wherein said control panel indicating means includes means for indicating operation on battery backup power to an operator.

20. The system of claim 19 wherein said indicating means includes a visual display and means for making an audio announcement.

21. The system of claim 17 wherein said second signal is a D.C. signal.

22. The system of claim 21 wherein said second signal is conducted to an electrical ground by said loop antenna, and said monitoring means includes means for detecting a loss of electrical connection to said electrical ground.

23. In a restricted area alarm system including a loop antenna oriented about a boundary, said antenna having means for broadcasting a signal which is received by a receiver attached to a subject, the improvement comprising a control panel, said control panel having means for generating a prerecorded voice encoded command for broadcasting over said loop antenna so that said subject hears said prerecorded voice encoded command as it moves near the loop antenna.

24. The system of claim 23 further comprising means carried by said subject for broadcasting a second signal to a second subject to thereby alert said second subject.

25. In a restricted area alarm system, said system including an antenna for defining an area within which a subject is desired to be confined, a transmitter for generating a signal for broadcast over said antenna, and a receiver adapted for attachment to said subject, the improvement comprising means for announcing a prerecorded spoken command as said subject moves within a predetermined distance of said antenna so that said signal activates said receiver.

26. The system of claim 25 further comprising means for changing said prerecorded spoken command.

27. The system of claim 26 wherein said antenna is a loop antenna arranged generally about the periphery of said defined area, and further comprising means for monitoring said loop antenna to detect a break therein.

* * * * *